(12) United States Patent
Mo

(10) Patent No.: US 11,233,946 B2
(45) Date of Patent: Jan. 25, 2022

(54) SYSTEMS AND METHODS FOR 3-DIMENSIONAL (3D) POSITIONING OF IMAGING DEVICE

(71) Applicant: ZHEJIANG DAHUA TECHNOLOGY CO., LTD., Zhejiang (CN)

(72) Inventor: Guoqiang Mo, Hangzhou (CN)

(73) Assignee: ZHEJIANG DAHUA TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/199,329

(22) Filed: Mar. 11, 2021

(65) Prior Publication Data
US 2021/0203855 A1 Jul. 1, 2021

Related U.S. Application Data

(63) Continuation of application No. PCT/CN2018/125754, filed on Dec. 29, 2018.

(30) Foreign Application Priority Data

Sep. 25, 2018 (CN) .......................... 201811115795.5

(51) Int. Cl.
*H04N 5/232* (2006.01)
*G06T 7/73* (2017.01)

(52) U.S. Cl.
CPC .......... *H04N 5/23299* (2018.08); *G06T 7/73* (2017.01); *H04N 5/23206* (2013.01);
(Continued)

(58) Field of Classification Search
CPC .......... H04N 5/23299; H04N 5/23206; H04N 5/23216; H04N 5/23225; G06T 7/73; G06T 2207/30244
(Continued)

(56) References Cited

U.S. PATENT DOCUMENTS 6,301,372 B1   10/2001  Tanaka
2004/0165076 A1*  8/2004  Nishimura ............ G06T 1/0007
                                                         348/211.2
(Continued)

FOREIGN PATENT DOCUMENTS

CN    105427282 A    3/2016
CN    105631454 A    6/2016
(Continued)

OTHER PUBLICATIONS

International Search Report in PCT/CN2018/125754 dated Jun. 27, 2019, 4 pages.
(Continued)

*Primary Examiner* — Usman A Khan
(74) *Attorney, Agent, or Firm* — Metis IP LLC

(57) ABSTRACT

A method and a system for updating coordinate conversion parameters are provided. The method may include obtaining a first image captured by an imaging apparatus under a first configuration, selecting a feature point of an object in the first image and obtaining first coordinates of the feature point of the object in the first image. The method may further include causing the imaging apparatus to change from the first configuration to a second configuration. The method may further include obtaining a second image captured by the imaging apparatus under the second configuration, identifying the feature point of the object in the second image, and obtaining second coordinates of the feature point of the object in the second image. The method may further include updating the initial coordinate conversion parameters to generate an updated coordinate conversion parameter set.

20 Claims, 9 Drawing Sheets

(52) U.S. Cl.
CPC ..... *H04N 5/23216* (2013.01); *H04N 5/23225* (2013.01); *G06T 2207/30244* (2013.01)

(58) Field of Classification Search
USPC ..................................................... 348/211.8
See application file for complete search history.

(56) References Cited

U.S. PATENT DOCUMENTS

| | | | |
|---|---|---|---|
| 2005/0163343 A1* | 7/2005 | Kakinami | G06K 9/00812 382/103 |
| 2008/0304699 A1* | 12/2008 | Yuasa | G06K 9/00281 382/100 |
| 2010/0165116 A1 | 7/2010 | Hsieh et al. | |
| 2013/0169822 A1 | 7/2013 | Zhu et al. | |
| 2018/0295270 A1 | 10/2018 | Oshima | |

FOREIGN PATENT DOCUMENTS

| | | |
|---|---|---|
| CN | 106482640 A | 3/2017 |
| CN | 106530358 A | 3/2017 |
| CN | 103905792 A | 8/2017 |
| CN | 108921901 A | 11/2018 |
| EP | 3067861 A2 | 9/2016 |
| WO | 2017132766 A1 | 8/2017 |

OTHER PUBLICATIONS

Written Opinion in PCT/CN2018/125754 dated Jun. 27, 2019, 4 pages.
The Extended European Search Report in European Application No. 18935450.9 dated Sep. 7, 2021, 8 pages.

* cited by examiner

800

810 Determining a geometric relationship between the feature point and the object in the first image

820 Identifying the object in the second image using an object identification algorithm

830 Identifying the feature point in the identified object in the second image based on the geometric relationship between the feature point and the object in the first image

FIG. 8

SYSTEMS AND METHODS FOR 3-DIMENSIONAL (3D) POSITIONING OF IMAGING DEVICE

CROSS-REFERENCE TO RELATED APPLICATIONS

This application is a Continuation of International Application No. PCT/CN2018/125754, filed on Dec. 29, 2018, which claims priority to Chinese Patent Application No. 201811115795.5 filed on Sep. 25, 2018, the entire contents of each of which are hereby incorporated by reference.

TECHNICAL FIELD

The present disclosure generally relates to positioning of an imaging apparatus, and in particular, to systems and methods for 3-dimensional (3D) positioning of an imaging device.

BACKGROUND

An imaging device (e.g., a camera), as convenient equipment for recording scenes in a particular moment, is widely used all over the world. Sometimes, a camera may be mounted on a camera stand to improve the capturing stability of the camera. Conventionally, a user may view image(s) or video(s) captured by the camera through a display of the camera or a display of a user device (e.g., a mobile device) that is connected to the camera through, e.g., a wireless network. The user may select a desired region and/or a target feature point on the display of his or her user device. 3D positioning is a technology for adjusting an orientation of a camera based on a definition of a user. The camera or a component thereof may calculate a desired angle of rotations of the camera stand based on a coordinate conversion parameter set provided by the manufacturer of the camera, which is a relationship between the coordinate system in the image captured by the camera and displayed on the display of the user device and the coordinate system of the camera or the camera stand. The coordinate conversion parameter set may vary between different brands or types of cameras. In order to perform a 3D positioning of a camera, the coordinate conversion parameter set has to be accurately provided; or the 3D positioning may be inaccurate and an image captured by the camera in an updated orientation may fail to match with the desired region and/or the target feature point. However, the coordinate conversion parameter set is sometimes unavailable or difficult to obtain from the camera manufacturer. Also, the coordinate conversion parameter set provided by a camera manufacturer may gradually become inaccurate during the use of the camera.

Therefore, it is desired to provide a system and method for determining and/or updating a coordinate conversion parameter set for any type or brand of camera without knowing the original coordinate conversion parameter set provided by the camera manufacturer.

SUMMARY

According to an aspect of the present disclosure, a method for updating coordinate conversion parameters is provided. The method may include obtaining a first image captured by an imaging apparatus under a first configuration. The method may also include selecting a feature point of an object in the first image. The method may further include obtaining first coordinates of the feature point of the object in the first image. The method may further include causing the imaging apparatus to change from the first configuration to a second configuration based on the first coordinates of the feature point of the object in the first image and an initial coordinate conversion parameter set. The method may further include obtaining a second image captured by the imaging apparatus under the second configuration. The method may further include identifying the feature point of the object in the second image. The method may further include obtaining second coordinates of the feature point of the object in the second image. The method may further include updating, based on the first coordinates of the feature point of the object in the first image and the second coordinates of the feature point of the object in the second image, the initial coordinate conversion parameters to generate an updated coordinate conversion parameter set.

In some embodiments, the first coordinates of the feature point of the object may include a first vertical coordinate and a first horizontal coordinate. The initial coordinate conversion parameter set may include an initial vertical conversion factor and an initial horizontal conversion factor. The method may further include causing an initial orientation of the imaging apparatus to change along a horizontal axis based on the first horizontal coordinate and the initial horizontal conversion factor. The method may further include causing the initial orientation of the imaging apparatus to change along a vertical axis based on the first vertical coordinate and the initial vertical conversion factor.

In some embodiments, the method may further include obtaining an angle between the vertical axis and the initial orientation of the imaging apparatus. The method may further include causing the imaging apparatus to rotate about the vertical axis based on the first horizontal coordinate, the initial horizontal conversion factor, and the angle between the vertical axis and the initial orientation of the imaging apparatus.

In some embodiments, the method may further include determining a geometric relationship between the feature point and the object in the first image. The method may further include identifying the object in the second image using an object identification algorithm. The method may further include identifying the feature point in the identified object in the second image based on the geometric relationship between the feature point and the object in the first image.

In some embodiments, the method may further include obtaining a third image captured by the imaging apparatus under a third configuration. The method may further include selecting a feature point of a second object in the third image. The method may further include obtaining third coordinates of the feature point of the second object in the third image. The method may further include causing the imaging apparatus to change from the third configuration to a fourth configuration based on the third coordinates of the feature point of the second object in the third image and the updated coordinate conversion parameter set.

In some embodiments, the method may further include transmitting the updated coordinate conversion parameter set to a storage device.

In some embodiments, the feature point may be at a corner, a boundary, a color changing point, or a center of the object.

In some embodiments, the first coordinates may include a first vertical coordinate. The second coordinates may include a second vertical coordinate. The initial coordinate conversion parameter set may include an initial vertical conversion factor. The updated coordinate conversion parameter set may include an updated vertical conversion factor. The method may further include determining a vertical difference between the first vertical coordinate and the second vertical coordinate. The method may further include generating the updated vertical conversion factor by updating the initial vertical conversion parameter set based on the vertical difference and the first vertical coordinate.

In some embodiments, the first coordinates may include a first horizontal coordinate. The second coordinates may include a second horizontal coordinate. The initial coordinate conversion parameter set may include an initial horizontal conversion factor. The updated coordinate conversion parameter set may include an updated horizontal conversion factor. The method may further include determining a horizontal difference between the first horizontal coordinate and the second horizontal coordinate. The method may further include obtaining an angle between a vertical axis and an initial orientation of the imaging apparatus. The method may further include generating the updated horizontal conversion factor by updating the initial horizontal conversion factor based on the first horizontal coordinate and the horizontal difference and the angle between the vertical axis and an initial orientation of the imaging apparatus.

In some embodiments, the imaging apparatus may be a dome camera. The method may include causing the imaging apparatus to rotate as a whole about a first axis. The method may further include causing a lens of the imaging apparatus to rotate about a second axis with respect to the imaging apparatus. The second axis may be perpendicular to the first axis.

In some embodiments, the method may further include displaying the first image on a display of a user device. The method may further include receiving a user input directed to a location on the display via a user interface. The method may further include determining a point in the first image corresponding to the location of the user input as the feature point of the object in the first image.

In some embodiments, the user input may include at least one of a touch, a click, a drag, a press, a gesture over a sensor, a voice command, or a double-click.

According to a further aspect of the present disclosure, a system for updating coordinate conversion parameters is provided. The system may include at least one storage medium storing a set of instructions and at least one processor configured to communicate with the at least one storage medium. When executing the set of instructions, the at least one processor may be directed to cause the system to obtain a first image captured by an imaging apparatus under a first configuration. The at least one processor may be further directed to cause the system to select a feature point of an object in the first image. The at least one processor may be further directed to cause the system to obtain first coordinates of the feature point of the object in the first image. The at least one processor may be further directed to cause the system to cause the imaging apparatus to change from the first configuration to a second configuration based on the first coordinates of the feature point of the object in the first image and an initial coordinate conversion parameter set. The at least one processor may be further directed to cause the system to obtain a second image captured by the imaging apparatus under the second configuration. The at least one processor may be further directed to cause the system to identify the feature point of the object in the second image. The at least one processor may be further directed to cause the system to obtain second coordinates of the feature point of the object in the second image. The at least one processor may be further directed to cause the system to update, based on the first coordinates of the feature point of the object in the first image and the second coordinates of the feature point of the object in the second image, the initial coordinate conversion parameters to generate an updated coordinate conversion parameter set.

According to still a further aspect of the present disclosure, a non-transitory computer readable medium is provided. The non-transitory computer readable medium storing instructions, the instructions, when executed by a computer, may cause the computer to implement a method. The method may include one or more of the following operations. The method may include obtain a first image captured by an imaging apparatus under a first configuration. The method may further include selecting a feature point of an object in the first image. The method may further include obtaining first coordinates of the feature point of the object in the first image. The method may further include causing the imaging apparatus to change from the first configuration to a second configuration based on the first coordinates of the feature point of the object in the first image and an initial coordinate conversion parameter set. The method may further include obtaining a second image captured by the imaging apparatus under the second configuration. The method may further include identifying the feature point of the object in the second image. The method may further include obtaining second coordinates of the feature point of the object in the second image. The method may further include updating, based on the first coordinates of the feature point of the object in the first image and the second coordinates of the feature point of the object in the second image, the initial coordinate conversion parameters to generate an updated coordinate conversion parameter set.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not drawn to scale. These embodiments are non-limiting exemplary embodiments, in which like reference numerals represent similar structures throughout the several views of the drawings, and wherein:

FIG. 8 is a flowchart illustrating an exemplary process for identifying the feature point in the second image according to some embodiments of the present disclosure.

DETAILED DESCRIPTION

Figure 1:
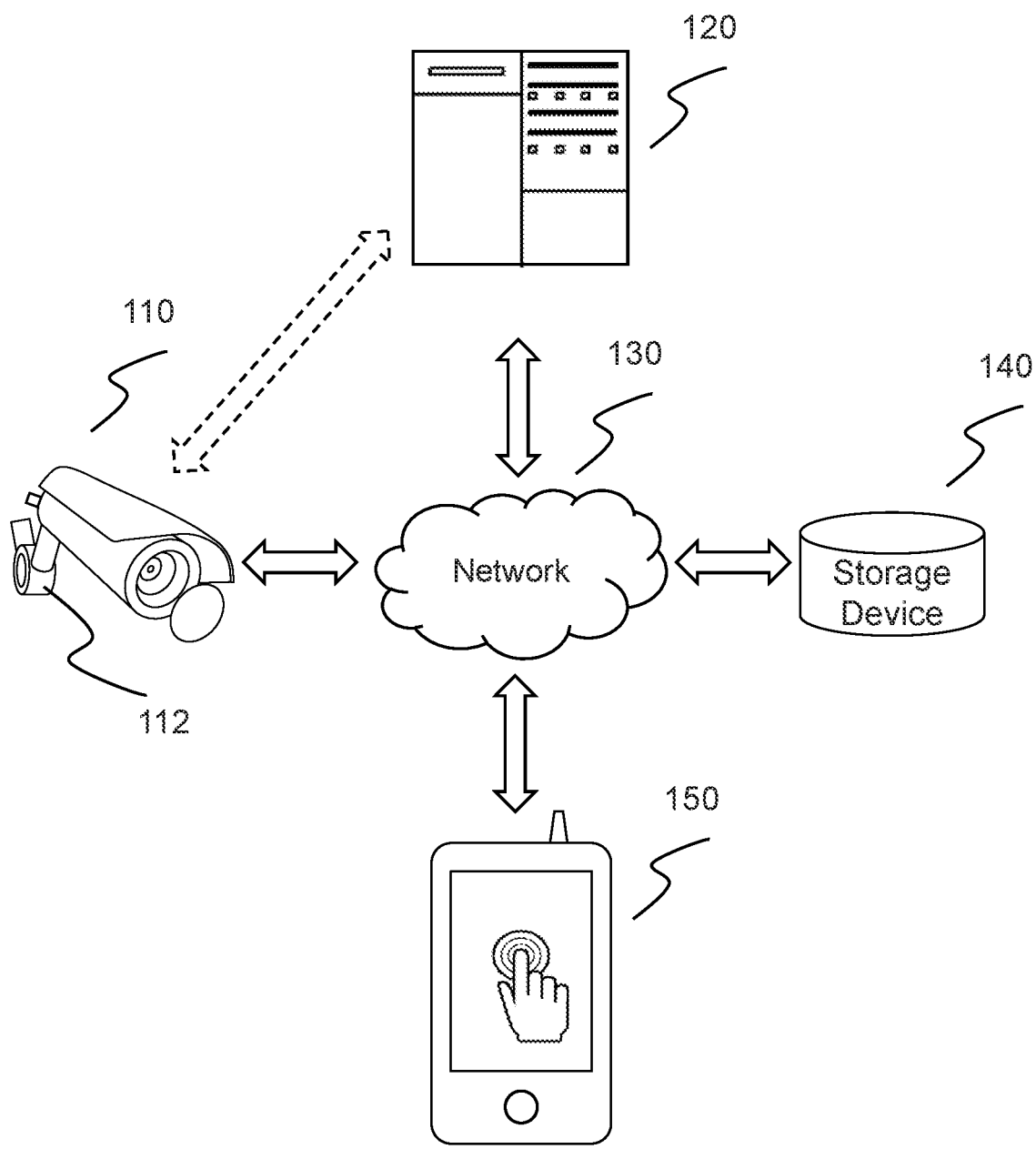
FIG. 1 is a schematic diagram of an exemplary monitoring system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "camera," "image apparatus," and/or "image device" used herein may be used interchangeably to refer to an image capturing component (e.g. lens), a camera, or a combination of a camera and the camera stand.

These and other features, and characteristics of the present disclosure, as well as the methods of operation and functions of the related elements of structure and the combination of portions and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

In order to make the purpose, technical solution, and advantages of the present disclosure clearer, the present disclosure will be further described in detail below with reference to the accompanying drawings and embodiments. It should be understood that the specific embodiments described herein are merely illustrative of the present disclosure and are not intended to limit the present disclosure.

The present disclosure relates to a method and system for updating a coordinate conversion parameter set. The coordinate conversion parameter set may refer to a relationship between a real-world coordinate system of the camera or a camera stand on which the camera is mounted (the term "camera" in the present disclosure may also refer to a combination of a camera and a corresponding camera stand) and the virtual coordinate system of the image captured by the camera and displayed on the display of the user device. According to the present disclosure, a first image may be obtained. The first image may be captured by a camera under a first orientation. A feature point may be selected in the first image, and the camera may be changed from the first orientation to a second orientation based on the first coordinates of the feature point and an initial coordinate conversion parameter set. A second image may be captured by the camera under the second orientation. Second coordinates of the feature point in the second image may be obtained. An updated coordinate conversion parameter set may be generated based on the initial coordinate conversion parameter set, the first coordinates of the feature point in the first image, and the second coordinates of the feature point in the second image.

FIG. 1 is a schematic diagram of an exemplary monitoring system according to some embodiments of the present disclosure. As illustrated in FIG. 1, monitoring system 100 may include an imaging device (e.g., a camera) 110, a processing device 120, a network 130, a storage device 140, and a user device 150 (e.g., a mobile device). The imaging device 110 may be a device other than a camera (e.g., a video recorder, an ultrasonic device, an infrared imaging device). The following descriptions are provided with reference to the imaging device 110 being a camera for illustration purposes and not intended to be limiting.

The camera 110 may be a device configured to capture one or more images. The captured images may be raw image data, a still image, a video, a streaming video, or a video frame obtained from a video. For example, the camera 110 may be a digital camera, a web camera, a smart phone, a tablet, a laptop, a video gaming console equipped with a web camera, a camera with multiple lenses, etc. In some embodiments, the camera 110 may include more than one camera configured to capture images. The camera 110 may be configured to capture two-dimensional (2D) images and/or three-dimensional (3D) images. For example, camera 110 may be a static camera, a pan-tilt-zoom (PTZ) camera, a moving camera, a stereoscopic camera, a structured light camera, a time-of-flight camera, etc. In some embodiments, camera 110 may also be a camera equipped with a time-of-flight device, a Kinect sensor, a 3D laser scanner, a photographic scanner, etc. The type of camera 110 may vary, depending on the installation location and/or the type of objects to be monitored. In some embodiments, camera 110 may transmit the images captured to the processing device 120, the storage device 140, or the user device 150.

The camera 110 may be installed on a camera stand 112. The camera stand 112 may be a rotatable stand that may control the orientation or detecting direction of the camera 110 (or the lens of the camera 110). The camera stand 112 may include at least one rotation component configured to facilitate an rotation of, e.g., 180 degrees or 360 degrees to multiple directions. For example, the at least one rotation component may allow the camera 110 to rotate as a whole about a first axis for 0-360 degrees. As another example, the at least one rotation component may allow the lens of the camera 110 to rotate about a second axis for 0-180 degrees. The second axis may be perpendicular to the first axis. In some embodiments, the camera stand 112 may be controlled by an operator or a controlling mechanism (e.g., a motor, a driving circuit, a controller). For example, an operator may rotate the camera stand 112 to a direction as he or she wishes. As another example, the controlling mechanism may receive an adjustment instruction from the processing device 120 or the user device 150 and control the camera stand 112 to rotate accordingly.

The processing device 120 may process an image generated by the camera 110 or retrieved from another component in the monitoring system 100 (e.g., the storage device 140, the user device 150, the network 130). The processing device 120 may evaluate the quality of the image and/or correct the image. For example, the processing device 120 may correct an image if the image is determined to be unsatisfactory. The processed or corrected image may be transmitted to the storage device 140 or the user device 150 via the network 130. The processing device 120 may generate an adjustment instruction based on, for example, a feature of an object, an image of an object, a video of an object, or the like, or a combination. The adjustment instruction may be used to adjust the orientation of the camera 110. For example, the processing device 120 may generate an adjustment instruction to cause the camera 110 to track an object in order for the camera 110 to capture an image of the object. Merely by way of example, the processing device 120 may determine a reference point (or feature point) based on an image of the environment captured by the camera 110. The processing device 120 may generate an adjustment instruction for changing the orientation of the camera 110 to the reference point based on a current orientation, a coordinate conversion parameter set, etc. In some embodiments, the processing device 120 may be integrated with the camera 110 as an integrated component to perform the functions of the camera 110 and/or the processing device 120.

The processing device 120 may be any suitable device that is capable of processing an image. For example, the processing device 120 may include a high-performance computer specializing in image processing or transaction processing, a personal computer, a portable device, a server, a microprocessor, an integrated chip, a digital signal processor (DSP), a tablet computer, a personal digital assistant (PDA), a mobile phone, or the like, or a combination thereof.

In some embodiments, the processing device 120 may include one or more processing engines (e.g., single-core processing engine(s) or multi-core processor(s)). Merely by way of example, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 130 may facilitate communications between various components of the monitoring system 100. The network 130 may be a single network, or a combination of various networks. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. The network 130 may also include various network access points, e.g., wired or wireless access points such as one or more base stations or Internet exchange points through which a data source may connect to the network 130 in order to transmit information via the network 130. For example, the camera 110 and the processing device 120 may transmit a raw image or processed image to the user device 150 and/or the storage device 140 via the network 130. As another example, the user device 150 and/or the processing device 120 may transmit adjustment instructions to the camera 110 or the camera stand 112 via the network 130. In some embodiments, the camera 110 may be connected with the processing device 120 via the network 130. In some embodiments, the camera 110 may be directly connected with the processing device 120 to exchange data or information as indicated by the bidirectional arrow in dashed lines in FIG. 1.

The storage device 140 may store data and/or instructions. The data may include an image (e.g., an image obtained by the camera 110), a processed image (e.g., an image processed by the processing device 120), an instruction (e.g., an adjustment instruction generated by the processing device 120 and/or the user device 150), etc. In some embodiments, the storage device 140 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The user device 150 may be configured to display images and/or generate instructions. For example, the user device

150 may be connected with the camera 110, the processing device 120, and/or the storage device 140 via the network 130. The user device 150 may receive raw image data from the camera 110 or processed image data from the processing device 120. The user device 150 may display the raw image data or processed image data on a display via a user interface (not shown in FIG. 1). In some embodiments, the user device 150 may include a control tool configured to adjust the displayed image data. For example, the control tool may include one or more physical buttons or control bars installed on or connected to the user device 150. As another example, the control tool may be a virtual tool displayed on the user device 150 via the user interface. In some embodiments, the display in the user device 150 may be a touch screen. A user may touch a position on the touch screen, and the user device 150 may generate an adjustment instruction according to the touch. Further, the user device 150 may transmit the adjustment instruction to the camera 110 via the network 130. The orientation of the camera 110 may be adjusted based on the adjustment instruction. For example, if a user touches a position that is above the coordinate origin (e.g., a center point of the image) on the display, an adjustment instruction of "rotating upwards" may be generated by the user device 150 and transmitted to the camera 110 or the camera stand 112. The camera 110 may then be caused to rotate upwards according to the adjustment instruction. In some embodiments, the camera 110 may capture new image data after the orientation of the camera 110 is adjusted based on the adjustment instruction. The new image data may be transmitted to the processing device 120, the storage device 140, and/or the user device 150.

Figure 2:
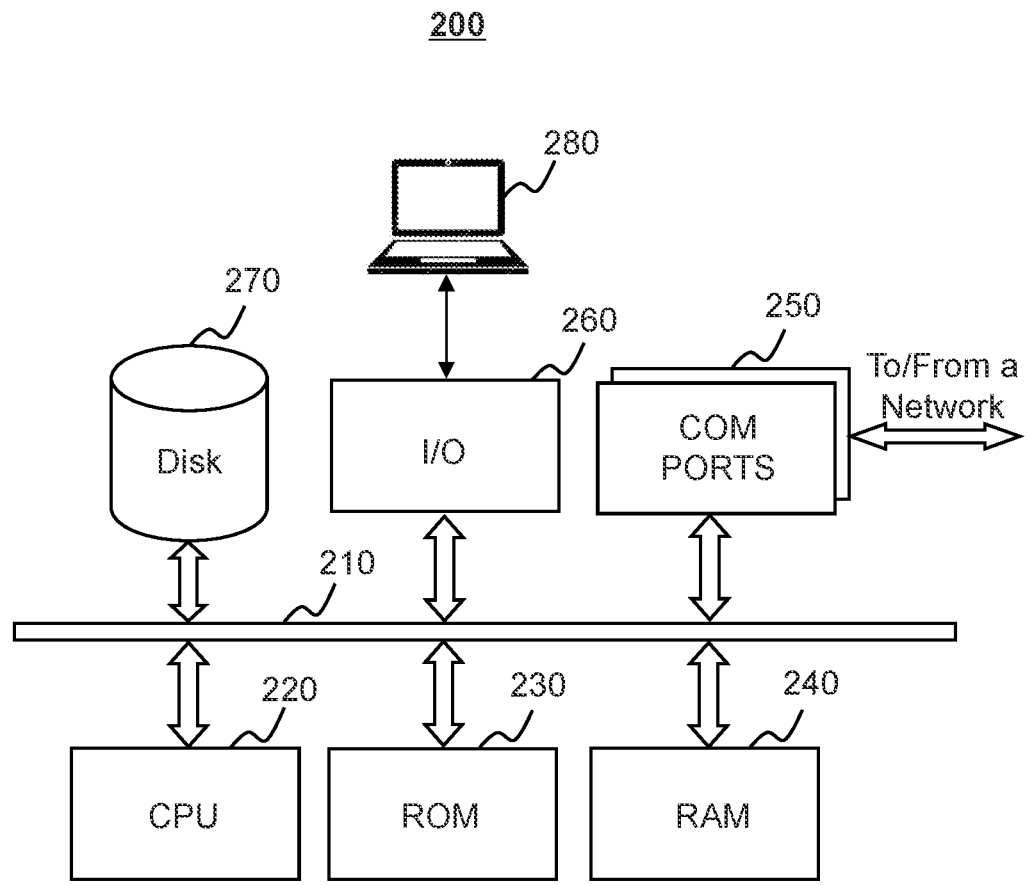
FIG. 2 is a schematic diagram illustrating an exemplary computing device according to some embodiments of the present disclosure.

FIG. 2 illustrates a schematic diagram of an exemplary computing device according to some embodiments of the present disclosure. The computing device may be a computer, such as the processing device 120 in FIG. 1 and/or a computer with specific functions, configured to implement any particular system according to some embodiments of the present disclosure. Computing device 200 may be configured to implement any components that perform one or more functions disclosed in the present disclosure. For example, processing device 120 may be implemented in hardware devices, software programs, firmware, or any combination thereof of a computer like computing device 200. For brevity, FIG. 2 depicts only one computing device. In some embodiments, the functions of the computing device, providing a function that route planning may need, may be implemented by a group of similar platforms in a distributed mode to disperse the processing load of the system.

Computing device 200 may include a communication terminal 250 that may connect with a network that may implement the data communication. Computing device 200 may also include a processor 220 (CPU) that is configured to execute instructions and includes one or more processors. The schematic computer platform may include an internal communication bus 210, different types of program storage units and data storage units (e.g., a disk 270, a read-only memory (ROM) 230, a random-access memory (RAM) 240), various data files applicable to computer processing and/or communication, and some program instructions executed possibly by the processor 220. Computing device 200 may also include an I/O device 260 that may support the input and output of data flows between computing device 200 and other components 280. Moreover, computing device 200 may receive programs and data via the communication network.

Figure 3:
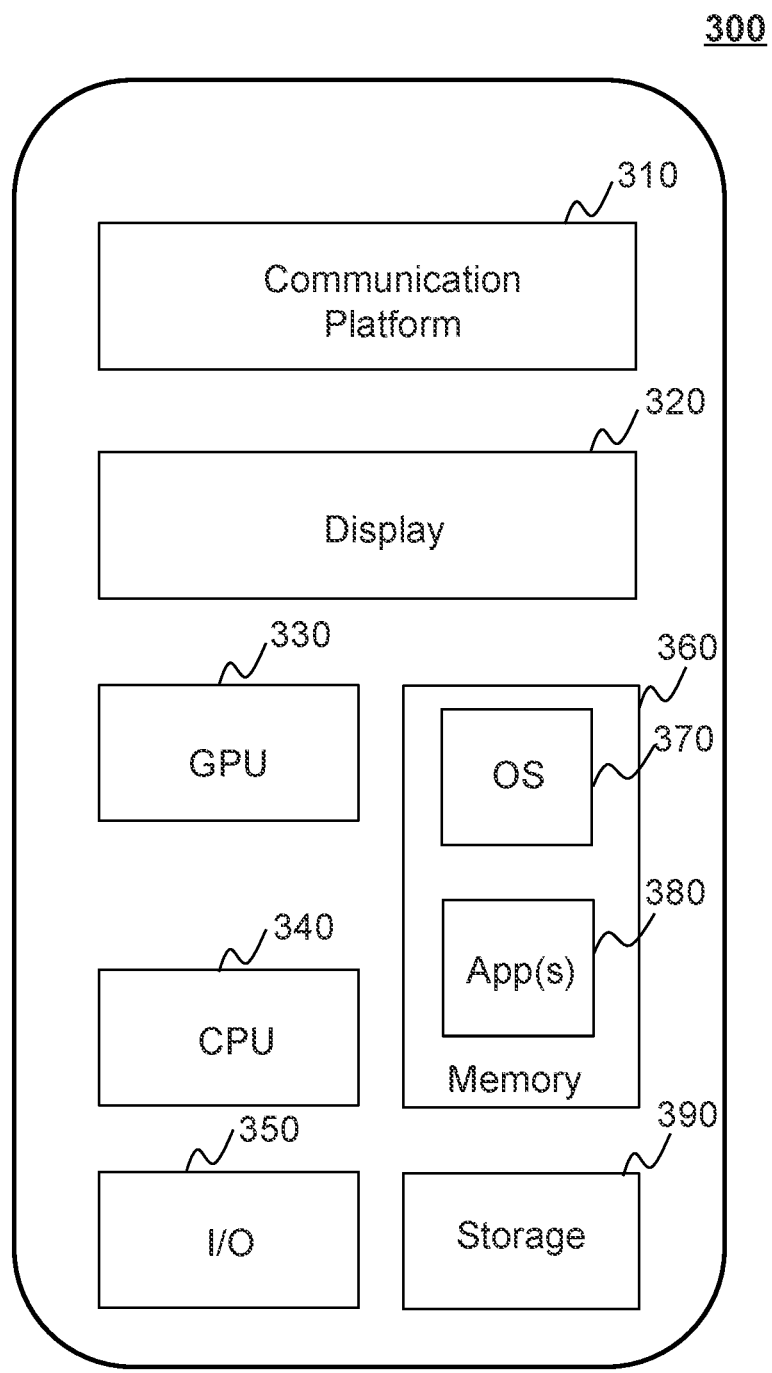
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device on which the user device 150, or the processing device 120 may be implemented according to some embodiments of the present disclosure. As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 (e.g., an application in connection with the camera 110 or the camera stand 112) may display one or more images captured by the camera 110 on the display 320 and may provide one or more virtual buttons for controlling the displayed images. The controlling of the displayed images may include but not limited to zooming in, zooming out, dragging, double-clicking, clicking, touching, selecting, rotating, etc. User interactions with the information stream may be achieved via the I/O 350 and provided to the processing device 120 and/or other components of the monitoring system 100 via the network 130.

Hence, aspects of the methods of the image processing and/or other processes, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Exemplary forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution (e.g., an installation on an existing server). In addition, image processing as disclosed herein may be implemented as firmware, a firmware/software combination, a firmware/hardware combination, or a hardware/firmware/software combination.

Figure 4:
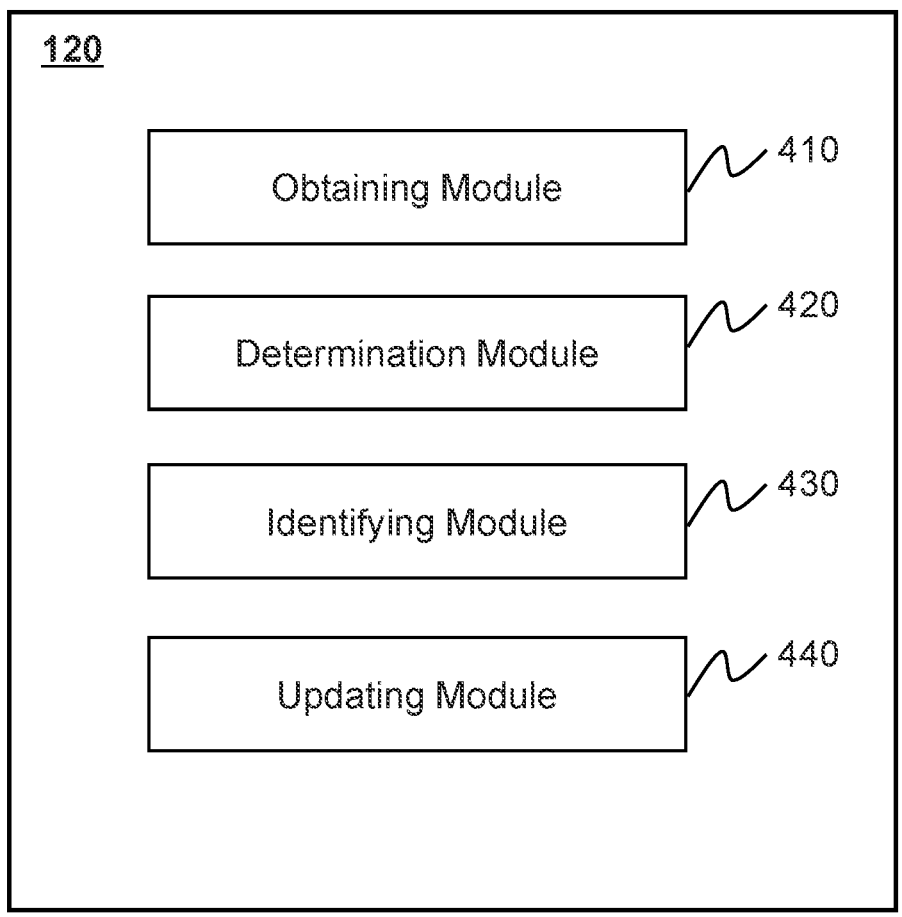
FIG. 4 is a schematic diagram illustrating an exemplary processing device according to some embodiments of the present disclosure.

FIG. 4 is a schematic diagram illustrating an exemplary processing device according to some embodiments of the present disclosure. The processing device 120 may include an obtaining module 410, a determination module 420, an identifying module 430, and an updating module 440.

The obtaining module 410 may be configured to obtain a first image and a second image. The first image and second image may be captured by an imaging apparatus or a camera (e.g., the camera 110) under a first configuration and a second configuration, respectively. In some embodiments, a feature point of an object may be include in the first and the second image. The obtaining module 410 may obtain first coordinates of the feature point in the first image and second coordinates of the feature point in the second image.

The determination module 420 may be configured to select the feature point of the object in the first image. In some embodiments, one or more object, as well as a plurality of candidate feature points, may be included in the object. The determination module 420 may select a point from the plurality of candidate feature points of the object as the feature point.

The identifying module 430 may be configured to identify the feature point of the object in the second image. In some embodiments, the identifying module 430 may first determine a geometric relationship between the feature point and the object in the first image. And then, the identifying module 430 may identify the object in the second image by using an object identification algorithm. Finally, the identifying module 430 may identify the feature point of the object in the second image based on the identified object in the second image and the determined geometric relationship between the feature point and the object.

The updating module 440 may be configured to update an initial coordinate conversion parameter set to generate an updated coordinate conversion parameter set. In some embodiments, the updating module 440 may determine the updated coordinate conversion parameter set based on the first coordinates of the feature point of the object in the first image, the second coordinates of the feature point of the object in the second image and the initial coordinate conversion parameter set.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing device 120 may further include an I/O module for facilitating interactions between the monitoring system 100 and a user.

Figure 5:
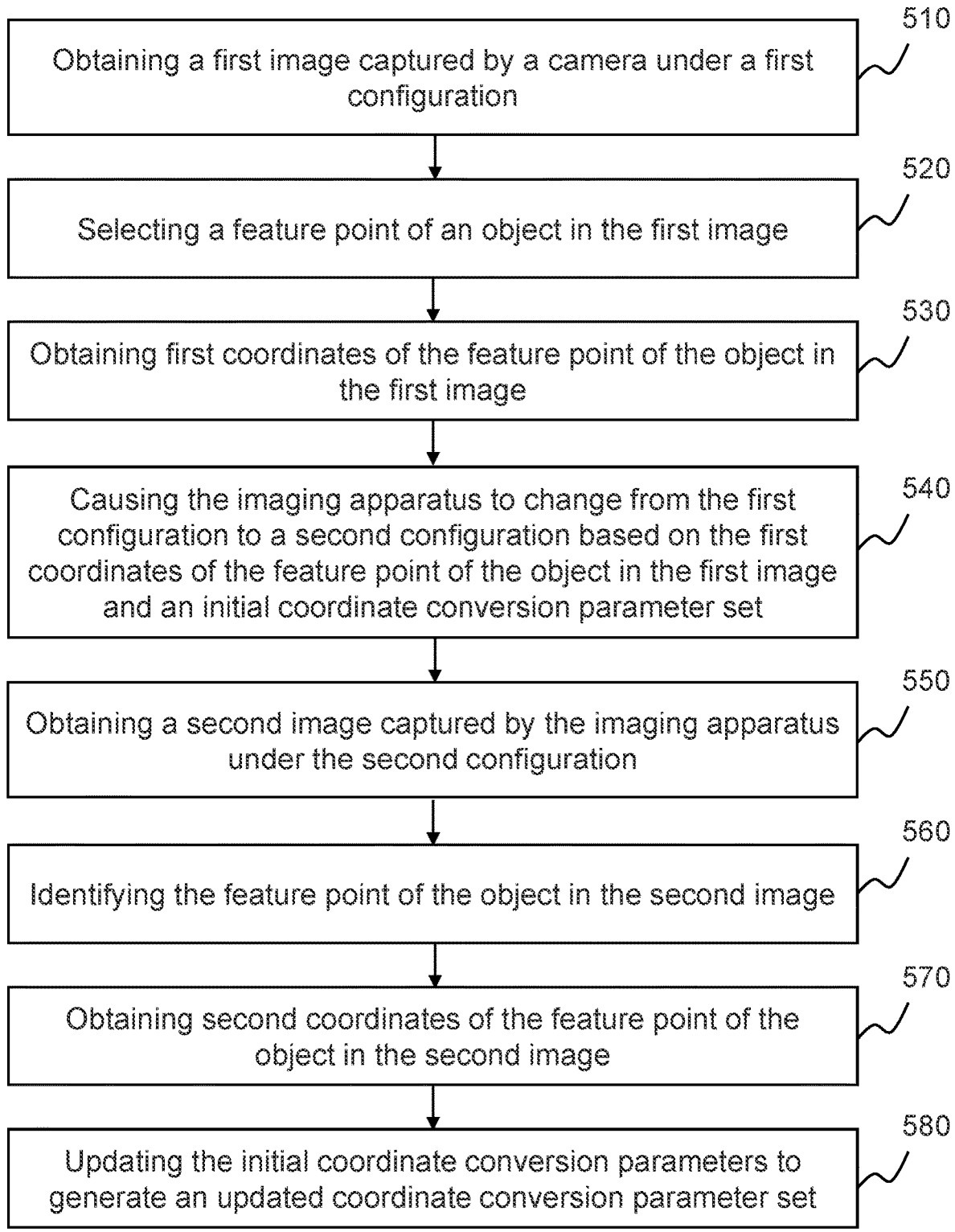
FIG. 5 is a flowchart illustrating an exemplary process for generating an updated coordinate conversion parameter set according to some embodiments of the present disclosure.

FIG. 5 is a flowchart illustrating an exemplary process for generating an updated coordinate conversion parameter set according to some embodiments of the present disclosure. In some embodiments, the process 500 may be implemented in the monitoring system 100 illustrated in FIG. 1. For example, the process 500 may be stored in a storage medium (e.g., the storage device 140, the disk 270, the memory 360, or the storage 390) in the form of instructions, and can be invoked and/or executed by the processing device 120 (e.g., the CPU 220, the CPU 340, or one or more modules in the processing device 120 illustrated in FIG. 4). The operations of the illustrated process 500 presented below are intended to be illustrative. In some embodiments, the process 500 may be accomplished with one or more additional operations not described, and/or without one or more of the operations discussed. Additionally, the order in which the operations of the process 500 as illustrated in FIG. 5 and described below is not intended to be limiting.

In 510, a first image may be obtained. The first image may be obtained by, for example, the obtaining module 410. In some embodiments, the first image may be captured by an imaging apparatus or a camera (e.g., the camera 110) under a first configuration. For example, the imaging apparatus may be a dome camera. The dome camera may be installed on a PTZ (pan-tilt-zoom) platform. The PTZ platform may be configured to adjust an orientation and a scale (or a focal length) of the dome camera. Merely by way of example, the "pan" may refer to a rotation in a horizontal plane (about a vertical axis); the "tilt" may refer to a rotation in a vertical plane (about a horizontal axis); and the "zoom" may refer to a change of scale and/or focal length. In some embodiments, the PTZ platform and/or the dome camera may be adjusted manually by an operator or automatically by a controlling mechanism (e.g., a motor, a driving circuit, a controller). For example, an operator may manually adjust the dome camera to a direction as he or she wants with hands. As another example, the controlling mechanism may receive an adjustment instruction from the processing device 120 or the user device 150 and control the dome camera to rotate to an orientation according to the adjustment instruction.

In some embodiments, the camera may be controlled to rotate in a horizontal direction (or referred to as a "pan") to a horizontal rotation angle and/or a vertical direction (or referred to as a "tilt") to a vertical rotation angle. In some embodiments, the horizontal rotation angle may be denoted as $\alpha$, and the vertical rotation angle may be denoted as $\beta$ (shown as $\alpha$ and $\beta$ respectively in FIG. 6A). The horizontal rotation angle $\alpha$ may fall in a first range (e.g., from 0 to 360 degrees), and the vertical rotation angle $\beta$ may fall in a second range (e.g., from 0 to 180 degrees). The first range and the second range may be different or the same. In some embodiments, a reference orientation of the camera may refer to the horizontal rotation angle $\alpha$ being 0 degrees and the vertical rotation angle $\beta$ being 90 degrees. For example, any direction in the real world (except the direction that is behind the dome camera or beneath the surface where the camera is mounted on the camera stand) may be represented by a horizontal rotation angle and a vertical rotation angle from the reference orientation. The first configuration may correspond to that the camera being oriented at a first horizontal rotation angle α1 and a first vertical rotation angle β1. Merely by way of example, the reference horizontal rotation angle α of 0 degrees may be a due north direction and the reference vertical rotation angle β of 90 degrees may be vertically downward. For example, the orientation of the camera may be 30 degrees northwest from the horizontal direction, and 45 degrees obliquely from the vertical direction under the first configuration. In this case, the orientation of the dome camera under the first configuration may be denoted as (α1, β1)=(30, 135).

In some embodiments, the first image may be obtained from a storage medium (e.g., the storage device 140, the disk 270, the memory 360, or the storage 390). For example, the first image may be obtained from the storage 390 of mobile device 300 (or user device 150) from a user other than the user of the mobile device 300 via the communication platform 310. As another example, the first image may be obtained from the storage device 140 via the network 130. In some embodiments, the first image may be displayed on a display (e.g., the display of the user device 150, the display 320 of mobile device 300). A user may view the first image on the display via, e.g., a user interface, an application (e.g., the application 380).

In 520, a feature point of an object in the first image may be selected. The feature point of an object may be selected by, for example, the determination module 420. In some embodiments, the feature point may be a corner point, a point on a boundary, a color changing point, or a center of the object. For example, the object may be a traffic light in the first image and the feature point may be the leftmost point on the boundary of the traffic light. As another example, the object may be a white car with a blue license plate and the feature point may be the color changing point between the blue license plate and the white car.

In some embodiments, one or more object, as well as a plurality of candidate feature points, may be included in the object. The determination module 420 may select a point from the plurality of candidate feature points of the object as the feature point. In some embodiments, a candidate feature point that may serve as a suitable focus for capturing an image including information of interest (e.g., license plate number of a car) using the camera may be selected as the feature point. For example, the first image may include an advertising board. The advertising board may include four corners corresponding to four candidate feature points $A_1$, $A_2$, $A_3$, and $A_4$ respectively. The candidate feature point $A_1$ corresponding to the top left corner may be selected as the feature point of the advertising board.

In some embodiments, the feature point may be determined based on the plurality of candidate feature points of the object. Still taking the first image including the advertising board as an example, according to the four candidate feature points $A_1$, $A_2$, $A_3$, and $A_4$ corresponding to the four corners of the advertising board, respectively, a center point $A_0$ of the advertising board may be determined. The determination module 420 may determine the center point $A_0$ as the candidate feature point of the advertising board.

In some embodiments, the feature points and/or the candidate feature points of the object in the first image may be determined manually. For example, a user (e.g., an operator of the user device 150) may determine the bottom left corner of the advertising broad as the feature point by providing a user input to the user device 150. The operator may provide the input through an operation of a control tool. The control tool may be a physical button or a control bar installed on or connected to the user device 150 or a virtual tool (e.g., the adjustment icon) displayed on the display 320. The user input may be provided in the form of a touch on the display 320 through a user interface. The user input may be provided in the form of a touch, a click, a drag, a press, a gesture over a sensor, a voice command, or a double-click.

In some embodiments, the feature point and/or the candidate feature point of the object in the first image may be determined based on an object identification algorithm. For example, through the object identification algorithm, a profile, including a plurality of candidate feature points, of the advertising broad may be recognized. Based on the profile of the advertising broad, the bottom left corner of the advertising broad may be further identified automatically by the determination module 420 as the feature point. As another example, using the object identification algorithm, a region, including a plurality of candidate feature points, corresponding to a license plate of a car may be recognized. A mounting screw of the license plate near the left top corner may be identified as the feature point. More descriptions of the determination of the feature points of the object in the first image may be found elsewhere in the present disclosure, e.g., FIG. 8 and the descriptions thereof.

In 530, first coordinates of the feature point of the object in the first image may be obtained. The first coordinates of the feature point may be obtained by, for example, the obtaining module 410. In some embodiments, the first coordinates of the feature point in the first image may be determined according to an image coordinate system with a coordinate origin and a unit length (e.g., 1 millimeter, 1 centimeter, the size of a pixel). For example, the first image may have a size of 600 millimeters width and 400 millimeters height and an image resolution of 50 pixels per millimeter. Assuming the point corresponding to the bottom left corner of the first image is the coordinate origin, and the feature point in the first image is 100 millimeters away from the bottom side and 50 millimeters away from left side of the first image. If the unit length is 1 millimeter, then the first coordinates of the feature point of the object in the first image may be denoted as (50, 100). If the unit length is equal to a length of one pixel, then the first coordinates of the feature point of the object in the first image may be denoted as (2500, 5000).

As another example, assuming that a point corresponding to a center point of the first image is the coordinate origin and the feature point of in the first image is 250 millimeters away from the bottom side and 400 millimeters away from left side of the first image. If the unit length is 1 millimeter, then the first coordinates of the feature point of the object in the first image may be denoted as (100, 50). If the unit length is equal to a length of one pixel, then the first coordinates of the feature point of the object in the first image may be denoted as (5000, 2500).

Figure 6A:
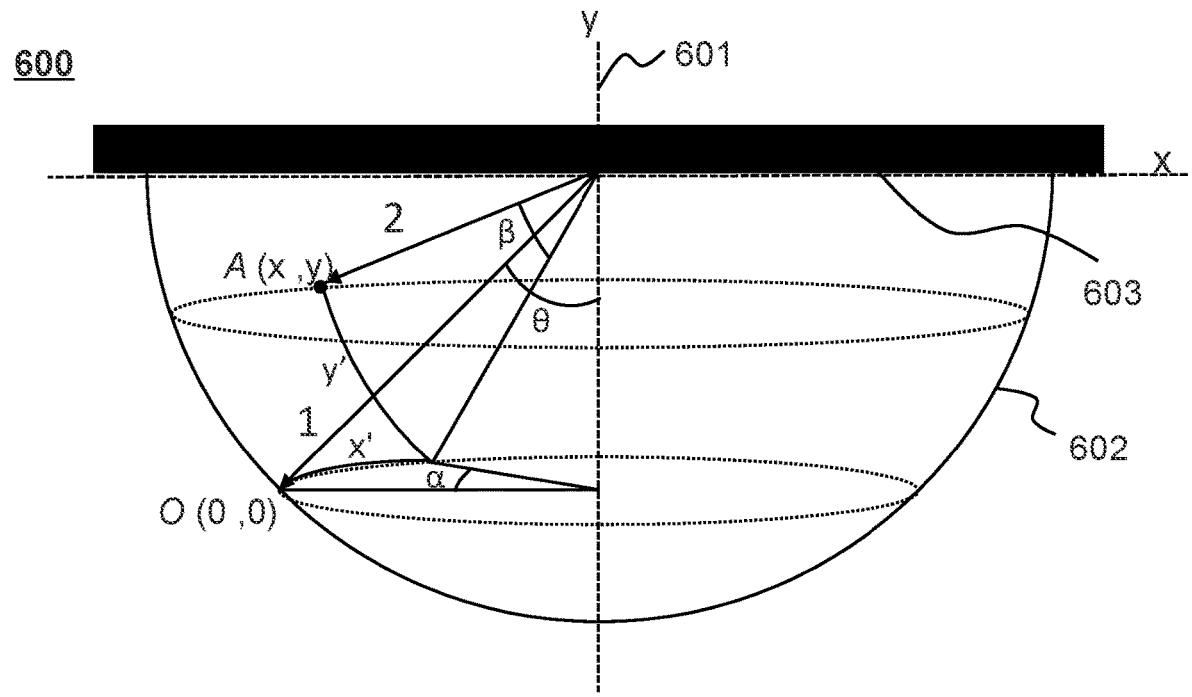
FIG. 6A and FIG. 6B are schematic diagrams illustrating a conversion relationship between the rotation angles of the camera in the imaging apparatus and the translation of the feature point according to some embodiments of the present disclosure.

In 540, the imaging apparatus or camera may be caused to change from the first configuration to a second configuration based on the first coordinates of the feature point of the object in the first image and an initial coordinate conversion parameter set. In some embodiments, the second configuration may correspond to a new orientation of the camera (e.g., camera 110 or the camera stand 112) that is different from the first orientation (or referred to as an initial orientation) of the camera under the first configuration. The changing of the camera from the first configuration to the second configuration may be achieved by a rotation of the camera (e.g., camera 110) or the camera stand (e.g., camera stand 112). The rotation of the camera may correspond to a translation of the coordinate origin of the image coordinate system. The rotation of the camera may include a horizontal rotation and a vertical rotation. The horizontal rotation and the vertical rotation of the camera may correspond to a translation of the coordinate origin along a horizontal axis (or X-axis) and a vertical axis (Y-axis) as illustrated in FIG. 6A, respectively. With the rotations of the camera, the feature point may also be translated. With an accurate coordinate conversion parameter set, the feature point may be desirably translated to the center point in a second image captured by the imaging apparatus under the second configuration. A rotation angle (e.g., a horizontal rotation angle and/or a vertical rotation angle) of the camera may be determined based on a translation distance (e.g., a translation distance along the X-axis and/or a translation distance along the Y-axis) from the coordinate origin to the feature point and the initial coordinate conversion parameter set (e.g., an initial horizontal conversion factor and an initial vertical conversion factor). For example, assuming that the translation distance along the X-axis is x, the translation distance along the Y-axis is y, the initial horizontal conversion factor is a, and the initial vertical conversion factor is b. The horizontal rotation angle α and the vertical rotation angle β may be determined as:

$$\alpha = a^* x / \sin\theta, \text{ and} \quad (1)$$

$$\beta = b^* y, \quad (2)$$

where θ denotes an angle between the orientation of the camera and the vertical axis.

More descriptions regarding the conversion relationship between the rotation angles of the camera in the imaging apparatus and the translation distances of the feature point may be found elsewhere in the present disclosure, e.g., FIG. 6 and the descriptions thereof.

In 550, a second image captured by the imaging apparatus under the second configuration may be obtained. The second image may be obtained by, for example, the obtaining module 410. As described in 540, the second configuration may correspond to a direction different from that of the first configuration. Under the second configuration, the feature point of the object may be adjusted to become the target point (e.g., the center point of the second image). In some embodiments, the image coordinate system (e.g., the coordinate origin, the unit length) of the second image may be the same as the image coordinate system of the first image. For example, if the point in the bottom left corner of the first image is determined as the coordinate origin, the point of the bottom left corner in the second image may be determined as the coordinate origin accordingly. As another example, if the center point of the first image is determined as the coordinate origin, the center point of the second image may be determined as the coordinate origin accordingly.

In 560, the feature point of the object in the second image may be identified. The feature point of the object may be identified by, for example, the identifying module 430. Similar to the operation 520, the feature point of the object in the second image may be identified manually or through an object identification algorithm. For example, the operator of the user device 150 may specify the feature point of the object in the second image by a touch operation on the display 320 via a user interface. As another example, using the object identification algorithm, the processing device 120 may first recognize the object that is selected in the first image, in the second image and then identify the feature point of the object. More descriptions regarding the identification of the feature point of the object in the second image may be found elsewhere in the present disclosure, e.g., FIG. 8 and the descriptions thereof.

In 570, second coordinates of the feature point of the object in the second image may be obtained. The second coordinates of the feature point may be obtained by, for example, the obtaining module 410. Similar to operation 530, the second coordinates of the feature point in the second image may be determined based on the image coordinate system of the second image. For example, the second image may have a size of 600 millimeters width and 400 millimeters height and an image resolution of 50 pixels per millimeter. Assuming the center point of the second image is the coordinate origin and the feature point of in the second image is 210 millimeters away from the bottom side and 295 millimeters away from the left side of the first image. If the unit length is 1 millimeter, then the first coordinates of the feature point of the object in the first image may be denoted as (−5, 10). If the unit length is equal to a length of one pixel, then the first coordinates of the feature point of the object in the first image may be denoted as (−250, 500).

In 580, the initial coordinate conversion parameter set may be updated to generate an updated coordinate conversion parameter set. The initial coordinate conversion parameters may be updated by, for example, the updating module 440. In some embodiments, the updated coordinate conversion parameter set may be determined based on the first coordinates of the feature point of the object in the first image, the second coordinates of the feature point of the object in the second image and the initial coordinate conversion parameter set (or a vertical difference between a first vertical coordinate and a second vertical coordinate, a horizontal, a horizontal difference between a first horizontal coordinate and a second horizontal coordinate). In particular, the updated coordinate conversion parameter set may include an updated horizontal conversion factor and an updated vertical conversion factor corresponding to the initial horizontal conversion factor and the initial vertical conversion factor, respectively. The updated coordinate conversion parameter set may be determined as:

$$a' = a^* \sin\theta^* x_1 / (x_1 - x_2), \text{ and} \quad (3)$$

$$b' = b^* y_1 / (y_1 - y_2), \quad (4)$$

where $x_1$ and $y_1$ denote the horizontal coordinate and vertical coordinate of the feature point of the object in the first image, respectively; $x_2$ and $y_2$ denote the horizontal coordinate and vertical coordinate of the feature point of the object in the second image, respectively; a and b denote the initial horizontal conversion factor and the initial vertical conversion factor, respectively; a' and b' denote the updated horizontal conversion factor and the updated vertical conversion factor, respectively; and θ denote an angle between an orientation of the camera and the vertical axis.

For example, assume that the initial horizontal conversion factor a and the initial vertical conversion factor b are equal to 1, the first coordinates of the feature point of the object in the first image are (50, 40), the second coordinates of the feature point of the object in the first image are (35, 30), and the angle between the orientation of the camera and the vertical axis is 30 degrees. According to the formulae (3) and (4), the updated horizontal conversion factor a' may be determined to be a'=1*sin 30°*50/(50−35)=5/7, and the updated vertical conversion factor b' may be determined to be b'=1*40/(40−30)=4.

For another example, assume that the initial horizontal conversion factor a and the initial vertical conversion factor b are equal to 1, the first coordinates of the feature point of the object in the first image are (10, 20), the second coordinates of the feature point of the object in the first image are (−5, 10), and the angle between the orientation of the camera and the vertical axis is 30 degrees. According to the formulae (3) and (4), the updated horizontal conversion factor a' may be determined to be a'=1*sin 30°*10/(10−(−5))=⅓, and the updated vertical conversion factor b' may be determined to be b'=1*20/(20−10)=2.

In some embodiments, the updated coordinate conversion parameter set may be used in future for changing the camera 110 from a third configuration to a fourth configuration. Ideally, if the updated coordinate conversion parameter set is calculated, any feature point in the image captured by the camera under the third configuration may be able to translated to any point (including the center point) on the image captured by the camera under the fourth configuration. The updated coordinate conversion parameter set may be the same as or different from the coordinate conversion parameter set provided by the manufacturer of the camera 110. The updated coordinate conversion parameter set may be stored in a shared storage device, such as a cloud-based network platform, a server, etc. Other users using the same brand and/or type of the camera may download and use the updated coordinate conversion parameter set.

It should be noted that the above description is merely provided for the purposes of illustration, and not intended to knit the scope of the present disclosure. For persons having ordinary skill in the art, multiple variations and modifications may be made under the teachings of the present disclosure. However, those variations and modifications do not depart from the scope of the present disclosure. For example, operation 520 and operation 530 may be combined into one operation to select the feature point in the first image and obtain its corresponding coordinates. As another example, an operation of determining the rotation angles of the camera may be included in process 500. Based on the rotation angles, the camera may be caused to change from the first configuration to the second configuration.

Figure 6B:
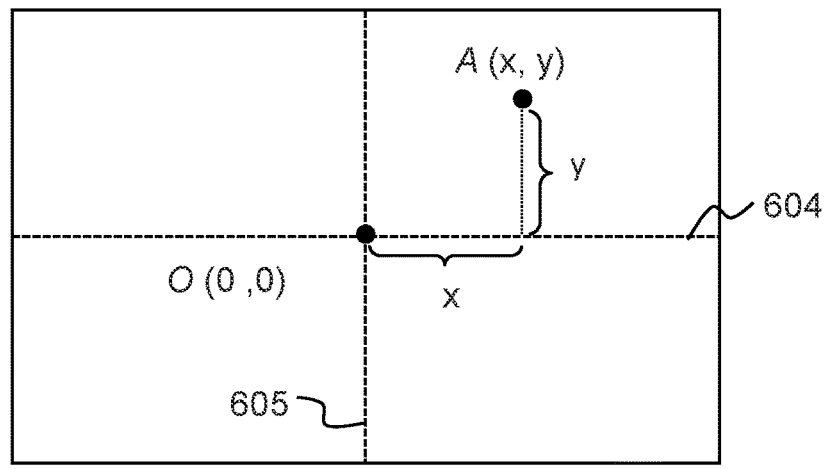

FIG. 6A and FIG. 6B are schematic diagrams illustrating a conversion relationship between the rotation angles of the camera in the imaging apparatus and the translation of the feature point according to some embodiments of the present disclosure. FIG. 6A and FIG. 6B may illustrate the changing direction of the camera when the feature point A in the first image is translated to the center point.

FIG. 6A shows two different directions (e.g., a first direction and a second direction (marked on the FIG. 6A as "1" and "2," respectively)) of camera 600. The first direction of the camera 600 may correspond to a first configuration of the imaging apparatus, while the second direction of the camera 600 may correspond to a second configuration of the imaging apparatus. The camera 600 may include a lens. A lens spherical surface 602 is included in FIG. 6A. The lens spherical surface 602 may be a collection of possible lens positions in different orientations. When the camera 600 faces the first direction, an angle, denoted as θ, between the first direction and the vertical axis 601 may be determined. When the camera 600 change its orientation from the first direction to the second direction, the camera 600 may rotate as a whole about the vertical axis 601 and the lens of the camera 600 may rotate about a horizontal axis 603 which is perpendicular to the vertical axis 601. The rotation of the camera 600 as a whole about the vertical axis 601 may correspond to a horizontal rotation angle, which is denoted as α. The rotation of the lens of the camera 600 about the horizontal axis 603 is correspond to a vertical rotation angle, which is denoted as β. The horizontal rotation angle α may correspond to a first arc length x', and the vertical rotation angle β may correspond to a second arc length y'.

FIG. 6B shows an image captured by the camera 600 when it faces the first direction. As shown in FIG. 6B, a center point and a feature point are included in the image. The center point is determined as the coordinate origin. The center point is denoted as O (0, 0), and the feature point is denoted as A (x, y). An X-axis 604 and a Y-axis 605 intersect at the center point O (0, 0), which divide the image into four regions.

In some embodiments, the rotation of the camera 600 from the first direction to the second direction may correspond to a translation of the coordinate origin from the center point O (0, 0) to the feature point A (x, y). As described above, the horizontal rotation angle α may correspond to the first arc length x'. In the image, it may correspond to a translation length x along the X-axis 604. The relationship of the arc length corresponding to the horizontal rotation angle and the translation length along the X-axis may be determined as:

$$x' = m * x, \quad (5)$$

where m represents a fixed coefficient relating to the camera 600 itself.

According to the arc length principle, the first arc length x' may also be determined as:

$$x' = R * \alpha, \quad (6)$$

where R represents a radius of a circle where the first arc length x' resides, and α represents a central angle of the first arc length x' in the circle. As used herein, the central angle of the first arc length x' is equal to the horizontal rotation angle α.

According to a geometric relationship, the radius of the circle where the first arc length x' resides may be determined as:

$$R = R_0 * \sin \theta, \quad (7)$$

where $R_0$ represents a length of the lens and θ represents the angle between the direction of the lens and the vertical axis.

Combining the formulae (5) to (7), the conversion relationship between the horizontal rotation angle and the translation length along the X-axis may be determined as:

$$\alpha = (m * x) / (R_0 * \sin \theta). \quad (8)$$

Considering that the coefficient m and the length of the lens $R_0$ are both fixed values for the camera 600, formula (8) may be expressed as:

$$\alpha = (a / \sin \theta) * x, \quad (9)$$

where a represents the initial horizontal conversion factor equal to a quotient of the coefficient m and the length of the lens $R_0$.

Considering that the radius of the circle that the second arc length y' resides is equal to the length of the lens, the relationship between the horizontal rotation angle β and the translation length along the Y-axis y may be determined in a similar way as:

$$\beta = b * y, \quad (10)$$

where b represents the initial vertical conversion factor.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, for different cameras, the length of the lens may be different which may cause different initial horizontal conversion factors and different initial vertical conversion factors.

Figure 7:
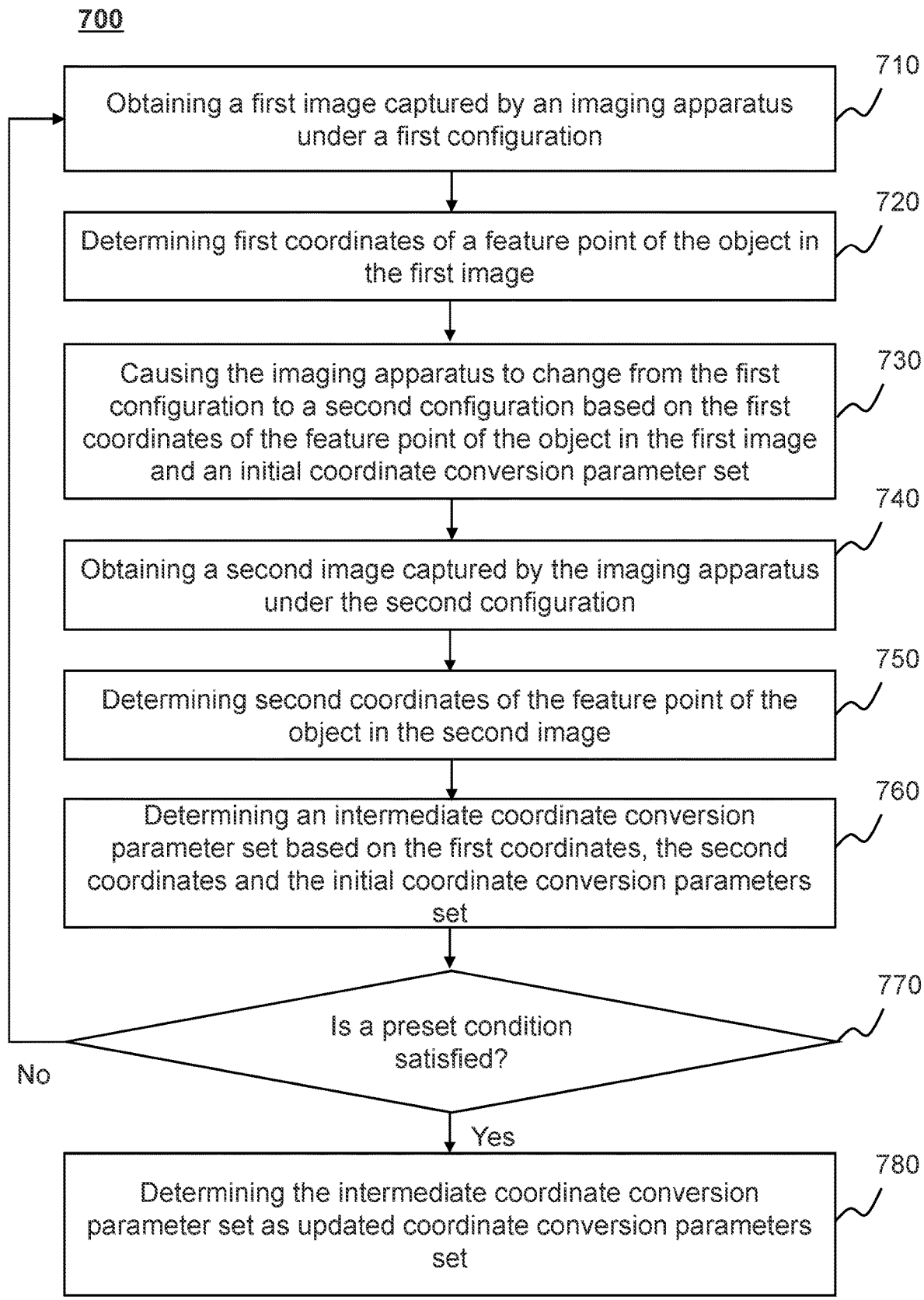
FIG. 7 is a flowchart illustrating an exemplary process for updating the coordinate conversion parameter set according to some embodiments of the present disclosure.

FIG. 7 is a flowchart illustrating an exemplary process for iterative updating the coordinate conversion parameter set according to some embodiments of the present disclosure. In some embodiments, the process 700 may be implemented in the monitoring system 100 illustrated in FIG. 1. For example, the process 700 may be stored in a storage medium (e.g., the storage device 140, the disk 270, the memory 360, or the storage 390) in the form of instructions, and can be invoked and/or executed by the processing device 120 (e.g., the CPU 220, the CPU 340, or one or more modules in the processing device 120 illustrated in FIG. 4). The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

Operation 710 to Operation 750 may be a process for obtaining first coordinates and second coordinates of a feature point of the object in the first image and the second image, respectively. Operation 710 may correspond to 510; operation 720 may correspond to 520 and 530; operation 730 may correspond to 540; operation 740 may correspond to 550; and operation 750 may correspond to 560 and 570. For brevity, these operations are not repeated herein.

In 760, an intermediate coordinate conversion parameter set may be determined based on the first coordinates, the second coordinates and the initial coordinate conversion parameters set. The intermediate coordinate conversion parameter set may include an intermediate horizontal coordinate conversion factor and an intermediate vertical coordinate conversion factor. In some embodiments, the intermediate horizontal coordinate conversion factor and the intermediate vertical coordinate conversion factor may be determined according to formulae (3) and (4), respectively.

In 770, the determination module 420 may determine whether a condition is satisfied. In some embodiments, the condition may be a parameter difference judgment (rule 1). For example, one or more cost functions may be used to represent the differences between the coordinate conversion parameter set in the current iteration and the coordinate conversion parameter set in the preceding iteration. Each of the one or more cost functions may correspond to a threshold. When a value of each of the one or more cost functions is less than its corresponding threshold, the condition is considered satisfied. For example, a first cost function associated with a difference between the current horizontal coordinate conversion factor and the preceding horizontal coordinate conversion factor, and has a value of 0.2. A second cost function associated with a difference between the current vertical coordinate conversion factor and the preceding vertical coordinate conversion factor, and has a value of 1.1. If the thresholds of the first cost function and the threshold of the second cost function are both 1.0, the condition is not satisfied because the value of the second function exceeds its corresponding threshold. If the threshold of the first cost function is 1.0 and the threshold of the second cost function is 1.5, the preset condition is considered satisfied. As another example, the cost function may be a sum of the differences between the current coordinate conversion parameter set and the preceding coordinate conversion parameter set. The difference between the current horizontal coordinate conversion factor and the preceding horizontal coordinate conversion factor is 0.8, and the difference between the current vertical coordinate conversion factor and the preceding vertical coordinate conversion factor is 0.3. In this situation, the cost function may have a value of 1.1. If the threshold of the cost function is 1.0, the condition is not satisfied as the value of the cost function exceeds the threshold.

In some embodiments, the condition may be a judgment of the number (or count) of iterations (rule 2). Merely by way of example, after determining the intermediate coordinate conversion parameter set in 760, the updating module 440 may update the number (or count) of iterations. For example, each time operation 760 is performed, the number (count) of iterations is increased by one. When the number (count) of iterations exceeds a threshold, the condition is considered satisfied.

In some embodiments, the condition may be a combination of the rule 1 and the rule 2. The updating module 440 may first determine whether the conditions in rule 1 is satisfied. If the conditions in rule 1 is satisfied, the updating module 440 may perform the operation 780. If the conditions in rule 1 is not satisfied, the updating module 440 may further determine whether the conditions in rule 2 is satisfied. If the conditions in rule 2 is satisfied, the updating module 440 may perform the operation 780. If the conditions in rule 2 is not satisfied, the updating module 440 may perform the operation 710 to operation 750 to obtain third coordinates and fourth coordinates of a feature point of an object in a third image and a fourth image, respectively (In other words, the coordinate conversion parameter set may be updated again by different feature points of different or the same object until it satisfies the condition).

In some embodiments, the third image and the fourth image may be captured by the camera 110 in different orientations. The feature point of the object in the third image and the fourth image may be different from that in the first image and the second image. For example, the feature point of the object in the first image and the second image may be the point corresponding to a left bottom corner of an advertising broad. The feature point of the object in the third image and the fourth image may be a top point of a road light.

In 780, the intermediate coordinate conversion parameter set may be designated as the updated coordinate conversion parameter set. In some embodiments, the updated coordinate conversion parameter set may be used in future for changing the camera 110 from a third configuration to a fourth configuration. If the updated coordinate conversion parameter set is ideally calculated, any feature point in the image captured by the camera under the third configuration may be able to be translated to any point (including the center point) on the image captured by the camera under the fourth configuration. The updated coordinate conversion parameter set may be the same or different from the coordinate conversion parameter set provided by the manufacturer of the camera 110. The updated coordinate conversion parameter set may be stored in a shared storage device, such as a cloud-based network platform, a server, etc. Other users using the same brand and/or type of the camera may download and use the updated coordinate conversion parameter set.

In some embodiments, if the camera and the camera stand (e.g., the camera 110 and the camera stand 112) are well calibrated and accurately designed and the updated coordinate conversion parameter set is accurately calculated, any feature point in the image captured by the camera under a fifth configuration may be able to be translated to a center point on the image captured by the camera after a rotation based on the updated coordinate conversion parameter set and the coordinates of feature point in the image captured by the camera under the fifth configuration, the process 700 may act as a verification process (e.g., if the feature point in the image captured by the camera after the rotation is at the center of the image, the updated coordinate conversion parameter set is verified (as a correct coordinate conversion parameter set)).

However, the camera and the camera stand may not be perfectly calibrated and designed. For example, the initial coordinate conversion parameter set may be any arbitrary number that is very different from the correct one, and the feature point is selected to be very far away from the center point in the first image. In other words, the required rotation may be very large. The large rotation may not be accurately performed or calculated because the camera and the camera stand are not perfectly calibrated and designed. The updated coordinate conversion parameter set may not be exactly same as the correct one after the first iteration. In this case, the process 700 may be performed iteratively to update the coordinate conversion parameter set such that each time an iteration is performed, an error between the updated conversion parameter set and the correct coordinate conversion parameter set is reduced.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, if a second feature is in the first image, process 500 may include the operations of determining the intermediate coordinate conversion parameter set based on the second feature point.

FIG. 8 is a flowchart illustrating an exemplary process for identifying the feature point in the second image according to some embodiments of the present disclosure. In some embodiments, the process 800 may be implemented in the monitoring system 100 illustrated in FIG. 1. For example, the process 800 may be stored in a storage medium (e.g., the storage device 140, the disk 270, the memory 360, or the storage 390) in the form of instructions, and can be invoked and/or executed by the processing device 120 (e.g., the CPU 220, the CPU 340, or one or more modules in the processing device 120 illustrated in FIG. 4). The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8 and described below is not intended to be limiting.

In 810, a geometric relationship between the feature point and the object in the first image may be determined. The geometric relationship may be determined by, for example, the identifying module 430. For example, the object may be a rectangle advertising broad and the feature point may correspond to the left bottom corner of the rectangle advertising broad.

In 820, the object in the second image may be identified using an object identification algorithm. The object in the second image may be identified by, for example, the identifying module 430. In some embodiments, the object identification algorithm may include a model. Merely by way of example, the model may include convolutional neural network (CNN), deep belief network (DBN), Stacked Auto-Encoders (SAE), logistic regression (LR) model, support vector machine (SVM), decision tree model, Naive Bayesian Model, random forest model. Restricted Boltzmann Machine (RBM), or Q-learning Model, or the like, or a combination thereof. The model may be trained based on a plurality of historical images. The plurality of historical images may include positive sample images and negative sample images. In the positive sample images, the object may be correctly identified by one or more features, such as color, size, shape, or the like or any combination thereof. In the negative sample images, conversely, the object may be misidentified. After the training of the plurality of historical images including positive sample images and negative sample images, the model may be used to identify the object in the second image.

In 830, the feature point in the identified object in the second image may be identified. The feature point may be identified, for example, the identifying module 430. In some embodiments, the geometric relationship between the feature point and the object in the second image may be the same as in the first image. The identifying module 430 based on the geometric relationship between the feature point and the object in the first image. For example, in the first image, the feature point may correspond to the license plate of a car. Then, after identifying the car in the second image in 820, the identifying module 430 may further identify the feature point based on the geometric relationship between the license plate and the car determined in 810.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, operation 820 and operation 830 may be combined into a single operation to directly identifying the feature point. As another example, a geometric relationship between the feature point and a stationary reference may be used to identify the feature point in the second image.

FIGS. 9A-9D are schematic diagrams illustrating one or more objects with at least one feature points according to some embodiments of the present disclosure. The objects in FIGS. 9A-9D may exist in the images captured by the camera 110 (e.g., the first image when the camera 110 is under a first configuration, the second image when the camera 110 is under a second configuration). In some embodiments, the objects in FIGS. 9A-9D may be static objects (e.g., the position of objects in the real world may not change when the imaging apparatus changes from the first configuration to the second configuration). The processing device 120 may identify at least one feature point on each of the images corresponding to the objects in FIGS. 9A-9D.

Figure 9A:
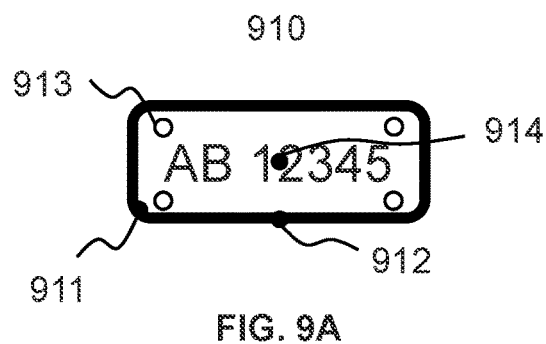
FIGS. 9A-9D are schematic diagrams illustrating one or more objects with at least one feature points according to some embodiments of the present disclosure.

FIG. 9A illustrates an exemplary license plate 910. Merely by way of example, the license plate number of the license plate 910 may be 'AB 12345'. Four screws 913 (shown as four circles) may be configured to fix the license plate 910 on a vehicle. In some embodiments, one or more points on the edges of the license plate 910 may be determined as the feature point(s). For example, the point 911 at the bottom left corner and/or the point 912 in the center of the bottom edge may be determined as the feature point(s). In some embodiments, a point on the license plate 910 may be determined as the feature point. For example, the point 913 corresponding to the mounting screw near the top left corner of the license plate 910 may be determined as the feature point. As another example, point 914 corresponding to the center point of the license plate 910 may be determined as the feature point.

Figure 9B:
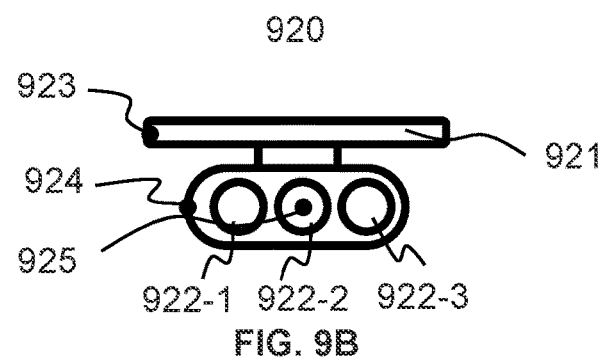

FIG. 9B illustrates an exemplary traffic light 920. The traffic light 920 may include a support rod 921 and a light component 922. The light component 922 may include a red light 922-1, a yellow light 922-2 and a green light 922-3. In some embodiments, at least one point on the traffic light 920 may be determined as the feature point. For example, the point 923 corresponding to the left end of the support rod 921, the point 924 corresponding to the left end of the signal light component 922, and/or the point 925 corresponding to the center point of the yellow light 922-2 may be determined as the feature point(s).

Figure 9C:
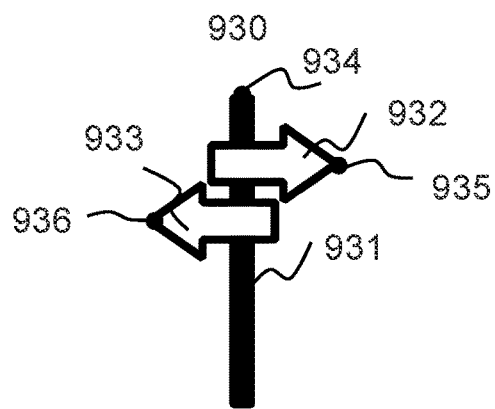

FIG. 9C illustrates an exemplary signpost 930. The signpost 930 may include a support pole 931, a first guide board 932 and a second guide board 933. In some embodiments, at least one point on the signpost 930 may be determined as the feature point. For example, the point 934 corresponding to the top end of the support rod 921 may be determined as the feature point. As another example, the point 935 corresponding to the right end of first guide board 932 may be determined as the feature point. As still another example, the point 936 corresponding to the left end of the second guide board 933 may be determined as the feature point.

Figure 9D:
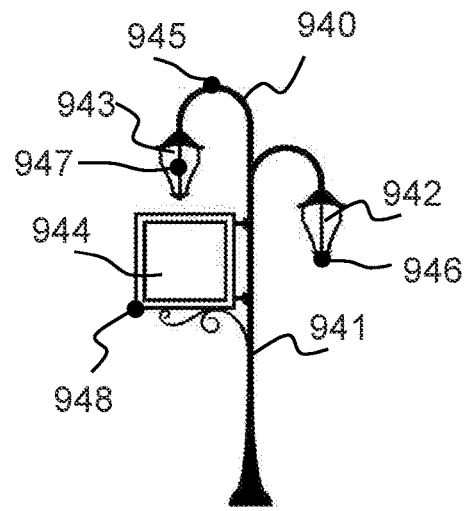

FIG. 9D illustrates an exemplary road light 940. The road light 940 may include a light pole 941, a first light 942, a second light 943, and a billboard 944. In some embodiments, at least one point on the road light 940 may be determined as the feature point. For example, point 945 corresponding to highest point of the light pole 941 may be determined as the feature point. As another example, point 946 corresponding to the bottom end of first light 942 may be determined as the feature point. As still another example, point 947 corresponding to the center point of second light 943 may be determined as the feature point. As yet another example, point 948 corresponding to the bottom left corner of billboard 944 may be determined as the feature point.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure. For example, other object including a plurality of candidate feature points may appear in the images, the identify module 430 may select the feature points from the plurality of candidate feature points of the other object.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A method implemented on a computing device having at least one storage device storing a set of instructions for updating coordinate conversion parameters, and at least one processor in communication with the at least one storage device, the method comprising:

obtaining a first image captured by an imaging apparatus under a first configuration;

selecting a feature point of an object in the first image;
obtaining first coordinates of the feature point of the object in the first image;
causing the imaging apparatus to change from the first configuration to a second configuration based on the first coordinates of the feature point of the object in the first image and an initial coordinate conversion parameter set;
obtaining a second image captured by the imaging apparatus under the second configuration;
identifying the feature point of the object in the second image;
obtaining second coordinates of the feature point of the object in the second image; and
updating, based on the first coordinates of the feature point of the object in the first image and the second coordinates of the feature point of the object in the second image, the initial coordinate conversion parameter set to generate an updated coordinate conversion parameter set.

2. The method of claim 1, wherein:
the first coordinates of the feature point of the object include a first vertical coordinate and a first horizontal coordinate;
the initial coordinate conversion parameter set includes an initial vertical conversion factor and an initial horizontal conversion factor; and
the causing the imaging apparatus to change from the first configuration to a second configuration based on the first coordinates of the feature point of the object in the first image and the initial coordinate conversion parameter set includes at least one of:
  causing an initial orientation of the imaging apparatus to change along a horizontal axis based on the first horizontal coordinate and the initial horizontal conversion factor; or
  causing the initial orientation of the imaging apparatus to change along a vertical axis based on the first vertical coordinate and the initial vertical conversion factor.

3. The method of claim 2, wherein:
the causing the initial orientation of the imaging apparatus to change along a horizontal axis based on the first horizontal coordinate and the initial horizontal conversion factor includes:
  obtaining an angle between the vertical axis and the initial orientation of the imaging apparatus; and
  causing the imaging apparatus to rotate about the vertical axis based on the first horizontal coordinate, the initial horizontal conversion factor, and the angle between the vertical axis and the initial orientation of the imaging apparatus.

4. The method of claim 1, the identifying the feature point of the object in the second image comprising:
determining a geometric relationship between the feature point and the object in the first image;
identifying the object in the second image using an object identification algorithm; and
identifying the feature point in the identified object in the second image based on the geometric relationship between the feature point and the object in the first image.

5. The method of claim 1, further comprising:
obtaining a third image captured by the imaging apparatus under a third configuration;
selecting a feature point of a second object in the third image;
obtaining third coordinates of the feature point of the second object in the third image; and
causing the imaging apparatus to change from the third configuration to a fourth configuration based on the third coordinates of the feature point of the second object in the third image and the updated coordinate conversion parameter set.

6. The method of claim 1, further comprising:
transmitting the updated coordinate conversion parameter set to a storage device.

7. The method of claim 1, wherein the feature point is at a corner, a boundary, a color changing point, or a center of the object.

8. The method of claim 1, wherein:
the first coordinates include a first vertical coordinate;
the second coordinates include a second vertical coordinate;
the initial coordinate conversion parameter set includes an initial vertical conversion factor;
the updated coordinate conversion parameter set includes an updated vertical conversion factor, and
the updating, based on the first coordinates of the feature point of the object in the first image and the second coordinates of the feature point of the object in the second image, the initial coordinate conversion parameter set to generate an updated coordinate conversion parameter set includes:
  determining a vertical difference between the first vertical coordinate and the second vertical coordinate; and
  generating the updated vertical conversion factor by updating the initial vertical conversion parameter set based on the vertical difference and the first vertical coordinate.

9. The method of claim 1, wherein:
the first coordinates include a first horizontal coordinate;
the second coordinates include a second horizontal coordinate;
the initial coordinate conversion parameter set includes an initial horizontal conversion factor;
the updated coordinate conversion parameter set includes an updated horizontal conversion factor, and
the updating, based on the first coordinates of the feature point of the object in the first image and the second coordinates of the feature point of the object in the second image, the initial coordinate conversion parameter set to generate an updated coordinate conversion parameter set includes:
  determining a horizontal difference between the first horizontal coordinate and the second horizontal coordinate;
  obtaining an angle between a vertical axis and an initial orientation of the imaging apparatus; and
  generating the updated horizontal conversion factor by updating the initial horizontal conversion factor based on the first horizontal coordinate, the horizontal difference, and the angle between the vertical axis and the initial orientation of the imaging apparatus.

10. The method of claim 1, wherein the imaging apparatus is a dome camera, and
the causing the imaging apparatus to change from the first configuration to a second configuration includes at least one of:
  causing the imaging apparatus to rotate as a whole about a first axis; or causing a lens of the imaging apparatus to rotate about a second axis with respect to the imaging apparatus, the second axis being perpendicular to the first axis.

11. The method of claim 1, the selecting a feature point of an object in the first image comprising:
displaying the first image on a display of a user device;
receiving a user input directed to a location on the display via a user interface; and
determining a point in the first image corresponding to the location of the user input as the feature point of the object in the first image.

12. The method of claim 11, wherein the user input includes at least one of:
a touch, a click, a drag, a press, a gesture over a sensor, a voice command, or a double-click.

13. A system for updating a coordinate conversion parameters parameter set, comprising:
at least one storage medium including a set of instructions; and
at least one processor in communication with the at least one storage medium, wherein when executing the set of instructions, the at least one processor is directed to cause the system to:
obtain a first image captured by an imaging apparatus under a first configuration;
select a feature point of an object in the first image;
obtain first coordinates of the feature point of the object in the first image;
cause the imaging apparatus to change from the first configuration to a second configuration based on the first coordinates of the feature point of the object in the first image and an initial coordinate conversion parameter set;
obtain a second image captured by the imaging apparatus under the second configuration;
identify the feature point of the object in the second image;
obtain second coordinates of the feature point of the object in the second image; and
update, based on the first coordinates of the feature point of the object in the first image and the second coordinates of the feature point of the object in the second image, the initial coordinate conversion parameter set to generate an updated coordinate conversion parameter set.

14. The system of claim 13, wherein to identify the feature point of the object in the second image, the at least one processor is directed to cause the system to:
determine a geometric relationship between the feature point and the object in the first image;
identify the object in the second image using an object identification algorithm; and
identify the feature point in the identified object in the second image based on the geometric relationship between the feature point and the object in the first image.

15. The system of claim 13, the at least one processor is further directed to cause the system to:
obtain a third image captured by the imaging apparatus under a third configuration;
select a feature point of a second object in the third image;
obtain third coordinates of the feature point of the second object in the third image; and
cause the imaging apparatus to change from the third configuration to a fourth configuration based on the third coordinates of the feature point of the second object in the third image and the updated coordinate conversion parameter set.

16. The system of claim 13, wherein:
the first coordinates include a first vertical coordinate;
the second coordinates include a second vertical coordinate;
the initial coordinate conversion parameter set includes an initial vertical conversion factor;
the updated coordinate conversion parameter set includes an updated vertical conversion factor, and
to update, based on the first coordinates of the feature point of the object in the first image and the second coordinates of the feature point of the object in the second image, the initial coordinate conversion parameter set to generate an updated coordinate conversion parameter set, the at least one processor is further directed to cause the system to:
determine a vertical difference between the first vertical coordinate and the second vertical coordinate; and
generate the updated vertical conversion factor by updating the initial vertical conversion parameter set based on the vertical difference and the first vertical coordinate.

17. The system of claim 13, wherein:
the first coordinates include a first horizontal coordinate;
the second coordinates include a second horizontal coordinate;
the initial coordinate conversion parameter set includes an initial horizontal conversion factor;
the updated coordinate conversion parameter set includes an updated horizontal conversion factor, and
to update, based on the first coordinates of the feature point of the object in the first image and the second coordinates of the feature point of the object in the second image, the initial coordinate conversion parameter set to generate an updated coordinate conversion parameter set, the at least one processor is further directed to cause the system to:
determine a horizontal difference between the first horizontal coordinate and the second horizontal coordinate;
obtain an angle between a vertical axis and an initial orientation of the imaging apparatus; and
generate the updated horizontal conversion factor by updating the initial horizontal conversion factor based on the first horizontal coordinate, the horizontal difference, and the angle between the vertical axis and the initial orientation of the imaging apparatus.

18. The system of claim 13, wherein the imaging apparatus is a dome camera, and to cause the imaging apparatus to change from the first configuration to a second configuration, the at least one processor is further directed to cause the system to:
cause the imaging apparatus to rotate as a whole about a first axis; or
cause a lens of the imaging apparatus to rotate about a second axis with respect to the imaging apparatus, the second axis being perpendicular to the first axis.

19. The system of claim 13, wherein to select a feature point of an object in the first image, the at least one processor is further directed to cause the system to:
display the first image on a display of a user device;
receive a user input directed to a location on the display via a user interface; and determine a point in the first image corresponding to the location of the user input as the feature point of the object in the first image.

20. A non-transitory computer readable medium, comprising executable instructions that, when executed by at least one processor, directs the at least one processor to perform a method for updating coordinate conversion parameters, the method comprising:

obtaining a first image captured by an imaging apparatus under a first configuration;

selecting a feature point of an object in the first image;

obtaining first coordinates of the feature point of the object in the first image;

causing the imaging apparatus to change from the first configuration to a second configuration based on the first coordinates of the feature point of the object in the first image and an initial coordinate conversion parameter set;

obtaining a second image captured by the imaging apparatus under the second configuration;

identifying the feature point of the object in the second image;

obtaining second coordinates of the feature point of the object in the second image; and updating, based on the first coordinates of the feature point of the object in the first image and the second coordinates of the feature point of the object in the second image, the initial coordinate conversion parameter set to generate an updated coordinate conversion parameter set.

* * * * *